United States Patent
Cheng

(10) Patent No.: US 10,694,315 B2
(45) Date of Patent: Jun. 23, 2020

(54) TECHNIQUE FOR ALLOWING REGISTERED MOBILE USERS OF THE SAME OR DIFFERENT SOCIAL NETWORKS IN THE VICINITY TO USE MOBILE DEVICES OF THE SAME OR DIFFERENT OPERATION SYSTEM TO IDENTIFY EACH OTHER AND EXCHANGE BUSINESS INFORMATION

(71) Applicant: Raymond Shu Kwok Cheng, Central (HK)

(72) Inventor: Raymond Shu Kwok Cheng, Central (HK)

(*) Notice: Subject to any disclaimer, the term of this patent is extended or adjusted under 35 U.S.C. 154(b) by 89 days.

(21) Appl. No.: 15/551,896

(22) PCT Filed: Aug. 26, 2016

(86) PCT No.: PCT/CN2016/096992
§ 371 (c)(1),
(2) Date: Aug. 17, 2017

(87) PCT Pub. No.: WO2018/035863
PCT Pub. Date: Mar. 1, 2018

(65) Prior Publication Data
US 2019/0124483 A1 Apr. 25, 2019

(51) Int. Cl.
*H04W 4/02* (2018.01)
*H04W 4/21* (2018.01)
*H04W 4/80* (2018.01)

(52) U.S. Cl.
CPC ............ *H04W 4/02* (2013.01); *H04W 4/023* (2013.01); *H04W 4/21* (2018.02); *H04W 4/80* (2018.02)

(58) Field of Classification Search
CPC .......... H04W 4/21; H04W 4/80; H04W 4/023
See application file for complete search history.

(56) References Cited

U.S. PATENT DOCUMENTS

| 2015/0099550 A1* | 4/2015 | Alharayeri | H04W 4/21 455/456.3 |
| 2015/0281878 A1* | 10/2015 | Roundtree | H04W 4/80 455/41.2 |
| 2016/0371736 A1* | 12/2016 | Turner | G06Q 30/0267 |

(Continued)

*Primary Examiner* — Ernest G Tacsik
(74) *Attorney, Agent, or Firm* — Intellectual Property Law Group LLP

(57) ABSTRACT

The present invention relates to a technique for allowing registered mobile users of the same or different social networks in the vicinity to use mobile devices of the same or different operation system to identify each other and exchange business information. Each registered mobile user discovers other registered mobile users in the proximity location through their mobile devices. A central server is configured to allow communication between a plurality of registered mobile users with connection through internet and to facilitate business information exchange between different mobile users. The central server manages introduction and connection of a plurality of registered mobile users by positive identification of registered mobile users, and associates unique identification of mobile user devices through Internet and returns identities of other mobile users in the vicinity or in proximity thereto, bringing an image of a human face along with names and business attributes to a device allocation.

44 Claims, 3 Drawing Sheets

(56) References Cited

U.S. PATENT DOCUMENTS

2017/0006127 A1\* 1/2017 Hishinuma ............. H04W 4/08
2017/0013569 A1\* 1/2017 Braxton .............. H04W 52/245
2017/0325067 A1\* 11/2017 Greenberger ......... H04W 4/025

\* cited by examiner

TECHNIQUE FOR ALLOWING REGISTERED MOBILE USERS OF THE SAME OR DIFFERENT SOCIAL NETWORKS IN THE VICINITY TO USE MOBILE DEVICES OF THE SAME OR DIFFERENT OPERATION SYSTEM TO IDENTIFY EACH OTHER AND EXCHANGE BUSINESS INFORMATION

TECHNICAL FIELD

The present invention relates generally to communication system, and more particularly to device connectivity in a communications network.

BACKGROUND ART

In light of the explosive use of mobile devices and social networks, business individuals are in need of the ability to exchange customized information such as pictures, social network profiles, emails and phone numbers using their mobile devices.

Technical Problem

There are methods to exchange contact information in the form of visual cards. However, there is generally no form of communication using mobile devices that allows discovery by business attributes for the purpose of exchanging contact information. Moreover, there is no available technology to allow mobile device users to easily exchange contacts and/or related business information over Internet for the purpose of business interaction by way of mobile devices in proximity location.

Solution to Problem

Technical Solution

In accordance with the present invention, a system comprises a central server allowing communication between a plurality of registered mobile users with connection through Internet and facilitating business information exchange between a plurality of mobile users in the vicinity or proximity location. The present invention relates to a technique for allowing mobile users of the same or different social networks in the vicinity to use mobile devices of the same or different operation system to identify each other and exchange business information. Each registered mobile user discovers other registered mobile users in the proximity location through their mobile devices. The central server then manages introduction and connection of a plurality of mobile users by positive identification of registered mobile users, and associates unique identification of mobiles devices through Internet and returns identities of other mobile users in the vicinity or in proximity thereto, bringing an image of a human face along with names and business attributes to a device allocation.

Advantageous Effects of Invention

Advantageous Effects

Each registered mobile user discovers other registered mobile users in the proximity location through their mobile devices. The central server then manages introduction and connection of a plurality of mobile users by positive identification of registered mobile users, and associates unique identification of mobiles devices through Internet and returns identities of other mobile users in the vicinity or in proximity thereto, bringing an image of a human face along with names and business attributes to a device allocation, thus achieving the advantageous effects of allowing mobile users of the same of different social networks in the vicinity to use mobile devices of the same or different operations system to identify each other and exchange business information.

BRIEF DESCRIPTION OF DRAWINGS

Description of Drawings

Figure 1:
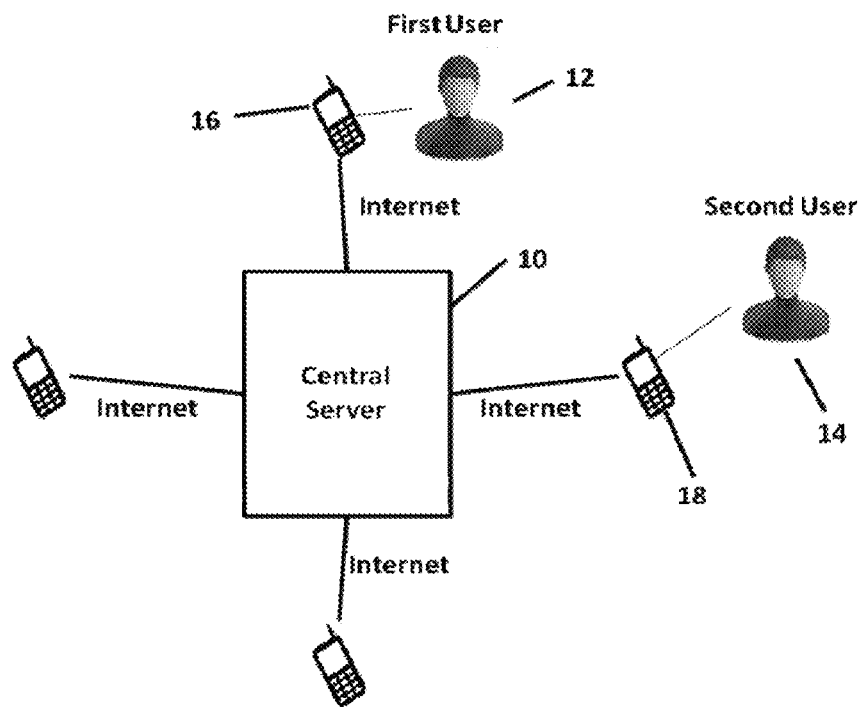

For a better understanding of the aforementioned embodiments of the invention as well as additional embodiments thereof, reference should be made to the Description of Embodiments below, in conjunction with the following drawings in which like reference numerals refer to corresponding parts throughout the figures.

Figure 2:
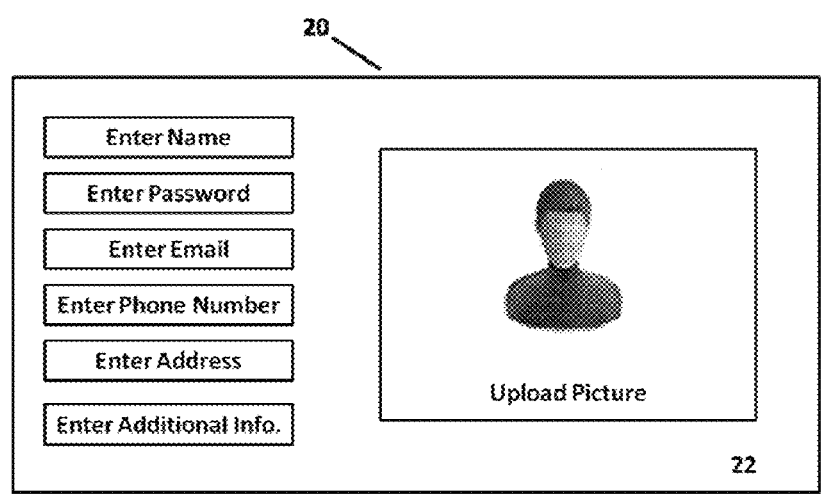
Figure 3:
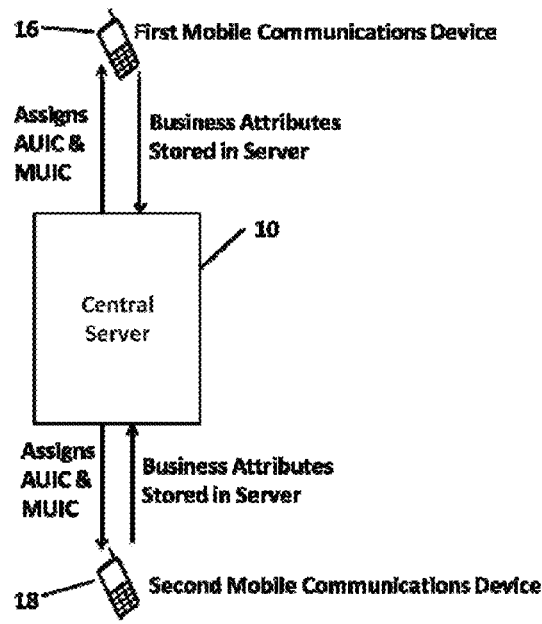
Figure 4:
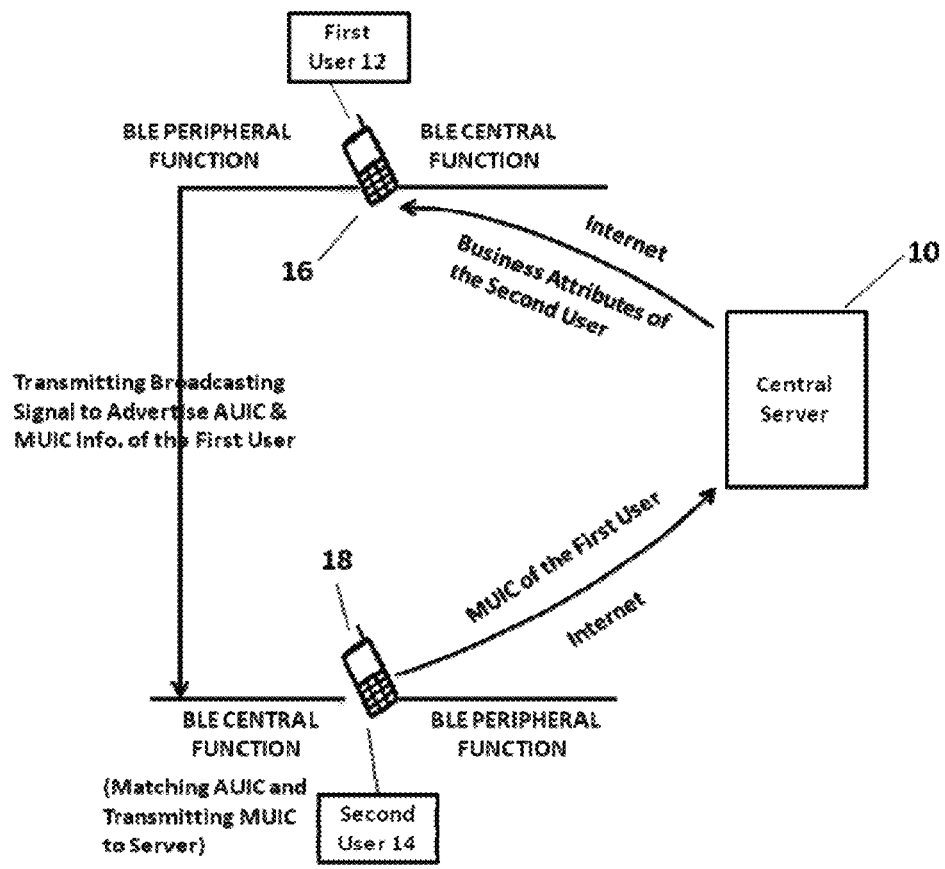
Figure 5:
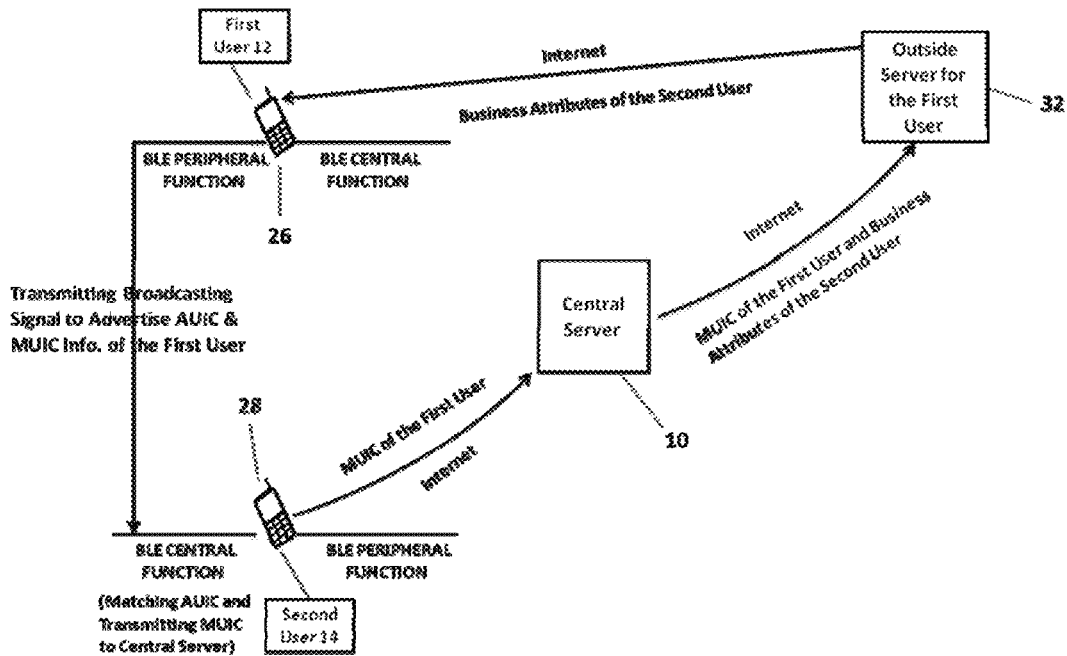
Figure 6:
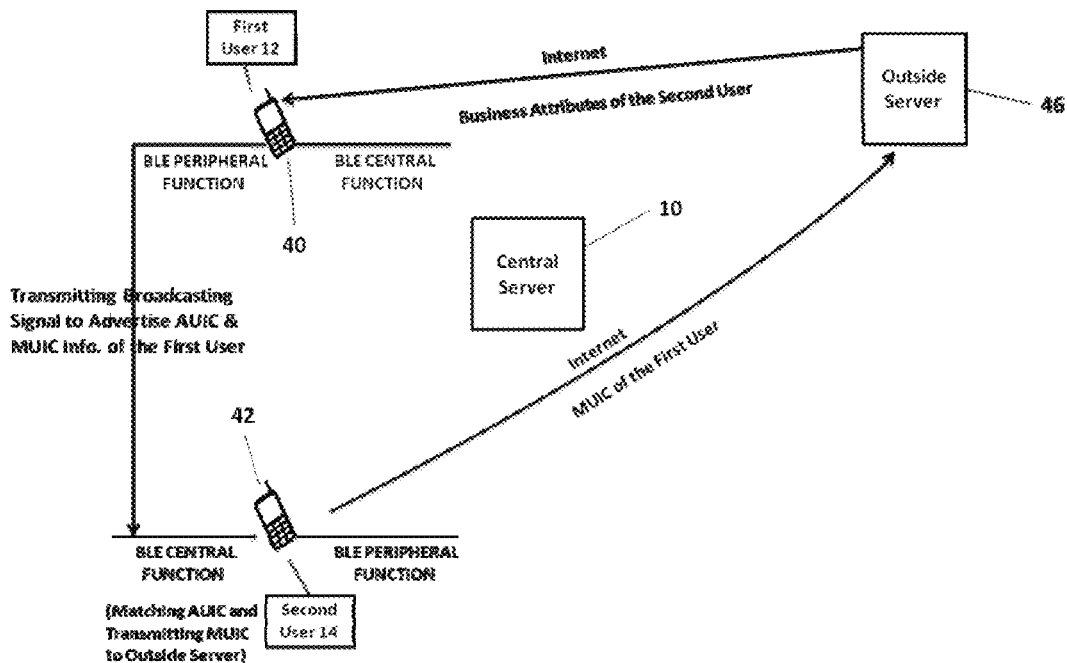

FIG. 1 illustrates communication links to/from mobile devices and a network-based central server, according to an embodiment herein;

FIG. 2 illustrates an example of a computer or mobile device, and a generated display for registering with a service, according to an embodiment herein;

FIG. 3 is a flowchart depicting the information exchange between the central server and registered mobile users, according to an embodiment herein;

FIG. 4 is a flowchart depicting the process of a mobile user initiating business attributes exchange by advertising her own AUIC and MUIC information, and receiving other mobile users' business attributes, according to an embodiment herein;

FIG. 5 is a flowchart depicting the process of a mobile user of an outside server initiating business attributes exchange by advertising her own AUIC and MUIC information, and receiving business attributes of a mobile user of another outside server, according to an embodiment herein;

FIG. 6 is a flowchart depicting the process of a mobile user of an outside server initiating business attributes exchange by advertising her own AUIC and MUIC information, and receiving business attributes exchange of a mobile user of another outside server without engaging the central server, according to an embodiment herein

BEST MODE FOR CARRYING OUT THE INVENTION

Best Mode

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein. As used herein, the terms "a" or "an" are used, as is common in patent documents, include one or more than one. In this document, the term "or" is used to refer to a "nonexclusive or" unless otherwise indicated.

The embodiments herein relate to members discovering other members who are in the vicinity by business attributes such as portrait picture(s), name and location. The business attributes are stored in the memory of the central server, and the central server associates unique identification of member devices through Internet and via a search process returns searches of members for others in the vicinity or in proximity thereto. Discovering other members would be for the purpose of exchanging business information. According to one aspect of the embodiments herein, mobile users sign up or register with the service by uploading a portrait picture and a business card image, and entering contact data in the central server.

FIG. 1 illustrates communication between a central server 10 and a plurality of registered mobile users, including a first user 12 and a second user 14, through Internet. The central server 10 is configured to facilitate business information exchange between the first user 12 and the second user 14. The central server 10 manages introduction and connection of a plurality of registered mobile users by positive identification of registered mobile users such as portrait picture(s) and name, and the central server 10 associates unique identification of member devices through Internet and via a search process returns search results of members for others in the vicinity or in proximity thereto, and brings an image of a human face with business attributes comprising pictures and names to a device allocation in the search process.

The first user 12 uses a first mobile communications device 16 and the second user 14 uses a second mobile communications device 18 each operatively connected to any of a mobile telecommunications provider network and an Internet connection to access the central server 10.

FIG. 2 depicts an example of a computer or mobile device 20, and generated display 22 for registering with a service. This service may provide a user with a network-based storage for business contact information, creation of a custom social card to send to discovered, or discovering registered mobile user who are also members of the service. The central server 10 stores registered business attributes of the first user 12 and the second user 14. In the generated display 22 on the screen of the mobile 20, mobile users can input business attributes such as name, password, Email, phone number, address, and other relevant information, and the business attributes are transmitted through Internet to be stored in the central server 10.

FIG. 3 is a flowchart depicting the information exchange between the central server and registered mobile users. The central server 10 is in communication with the first mobile communications device 16 and the second mobile communications device 18 through Internet connection via an application installed on the devices. The central server further assigns an APP UNIQUE IDENTIFICATION CODE (AUIC) and a MEMBER UNIQUE IDENTIFICATION CODE (MUIC) to the first mobile communications device 16 and the second mobile communications device 18 respectively. Business attributes input by the first user 12 in the first mobile communications device 16 is transmitted to and stored in the central server 10 through Internet, and business attributes input by the second user 14 in the second mobile communications device 18 is transmitted to and stored in the central server through Internet.

FIG. 4 is a flowchart depicting the process of registered mobile users initiating business attributes exchange by advertising their own AUIC and MUIC information, and receiving other registered mobile users' AUIC and MUIC information. The first mobile communications device 16 triggers two functions, namely Bluetooth low energy (BLE) CENTRAL and Bluetooth low energy (BLE) PERIPHERAL, upon the first user 12 pressing the RADAR MODE in the application, and the RADAR MODE also triggers internet connection to inform the location of the first mobile communications device 16 to the central server 10. Likewise, the second mobile communications device 18 triggers two functions, namely BLE CENTRAL and BLE PERIPHERAL, upon the second user 14 pressing the RADAR MODE in the application, and RADAR MODE also triggers internet connection to inform the location of the second mobile communications device 18 to the central server 10.

The BLE PERIPHERAL function triggered by the first mobile communications device 16 transmits broadcasting signals to advertise the stored AUIC and MUIC information of the first user 12. The BLE CENTRAL function triggered by the second mobile communications device 18 receives the broadcasting signal of the BLE PERIPHERAL function from the first mobile communications device 16 within a proximity location of 20 meters in maximum. Further, the BLE CENTRAL function only accepts the broadcasting signal upon the identification and matching of the AUIC information in the broadcasting signal of the BLE PERIPHERAL function from the first mobile communications device 16.

The central server 10 receives the MUIC information of the first user 12 transmitted from the second mobile communications device 18 through Internet and subsequently transmits stored business attributes of the second user 14 to the first mobile communications device 16 through Internet. The central server 10 locates business attributes about the first user 12 from a social network storage file (not shown) of the first user 12, and transmits business attributes to the second mobile communications device 18 for further information beyond first introductory attributes such as portrait picture and name.

Upon receiving the business attributes of the second user 14, the first mobile communications device 16 displays the portrait picture and name of the second user 14 on the screen, and the first user 12 has the option to select the second user 14 by pressing on the portrait picture.

FIG. 1 also illustrates the central server 10 is operable to provide any user with business attributes of all members of registered mobile users in the vicinity or in proximity FIG. 3 also illustrates the first mobile communications device 16 stores the AUIC and MUIC information assigned by the central server 10 through the installed application. The first user 12 and second user 14 are members of registered mobile users, and the central server 10 is operable to disclose business attributes of the first user 12 and the second user 14 in the vicinity.

FIG. 4 also illustrates the RADAR MODE (not shown) triggers two functions, namely BLE CENTRAL and BLE PERIPHERAL, for a predefined period of time and broadcasting signal strength, and the BLE PERIPHERAL transmits a broadcasting signal to advertise and broadcast the AUIC and MUIC information of the first user (12) to all other registered mobile users in the vicinity of 20 meters in maximum in clear space. The BLE CENTRAL function from the second mobile communications device (18) receives all broadcasting signals from the BLE PERIPHERAL function within the proximate location, and only accepts the broadcasting signal from the first mobile communications device 16 upon the identification and matching of the AUIC information in the broadcasting signal by the BLE PERIPHERAL function.

FIG. 4 further illustrates the central server 10 receives the MUIC information as the identifying signal from the second mobile communications device 18 regarding other registered mobile users in proximity to the second user 14 location. The central server 10 transmits to the first user 12 further business attributes of one of more of selected additional users beyond the portrait picture and name used in the introductory search results.

FIG. 4, with reference to FIGS. 1 through 3, shows in detail how registered mobile users may exchange business attributes in four steps:

Step 1: two or more registered mobile users (the first user 12 and the second user 14 here) wishing to exchange business attributes press the RADAR MODE in the installed application.

Step 2: the first mobile communications device 16 and the second mobile communications device 18 are configured to trigger two functions, namely BLE CENTRAL and BLE PERIPHERAL, upon users pressing the RADAR MODE in the installed application. The BLE PERIPHERAL function triggered by the first mobile communications device 16 transmits broadcasting signals to advertise the AUIC and MUIC information of the first user 12. The BLE CENTRAL function triggered by the second mobile communications device 18 receives the broadcasting signal of the BLE PERIPHERAL function from the first mobile communications device 16 within a proximity location of 20 meters in maximum. The BLE CENTRAL function only accepts the broadcasting signal upon the identification and matching of the AUIC information in the broadcasting signal of the BLE PERIPHERAL function from the first mobile communications device 16.

Step 3: the second mobile communications device 18 is triggered to transmit the MUIC information of the first user 12 through Internet to the central server 10 upon the identification and matching of the AUIC information in the broadcasting signal from the first mobile communications device 16. The central server 10 receives the MUIC information as the identifying signal regarding other registered mobile users in proximity to the second user location.

Step 4: the central server 10 subsequently transmits stored business attributes of the second user 14 to the first mobile communication device 16 through Internet upon receiving the MUIC information of the first user 12 transmitted from the second mobile communications device 18. The first mobile communications device 16 then displays the portrait picture and name of the second user 14 on the screen, and the first user 12 has the option to select the second user 14 by pressing on the portrait picture and view the stored business attributes.

FIG. 5 illustrates the process of a mobile user 12 of an outside server 32 which is registered with the central server 10, initiating business attributes exchange by advertising her own AUIC and MUIC information, and receiving business attributes of a mobile user 14 of the central server 10. A central server 10 allows communication between a plurality of mobile users with connection through internet and to facilitate business information exchange between a first user and a second user.

The central server 10 manages introduction and connection of a plurality of mobile users by positive identification of mobile users such as portrait picture(s) and name, and said central server 10 associates unique identification of mobile user devices through Internet and via a search process returns search results of other mobile users in the vicinity or in proximity thereto, and comprising pictures and names bringing an image of a human face with business attributes to a device allocation in the search process.

The central server 10 is in communication with the first mobile communications device 26 and the second mobile communications device 28 through internet connection via an application installed on the devices, and is configured to assign an APP UNIQUE IDENTIFICATION NUMBER (AUIC) and a MEMBER UNIQUE IDENTIFICATION NUMBER (MUIC) to the first mobile communications device 26 and the second mobile communications device 28 respectively.

The outside server for the first user 32 is configured to store business attributes of the first user 12 comprising contact details, a portrait picture, and a business card image, and provide access the stored business attributes to the first user 12, and the central server 10 is configured to store business attributes of the second user 14 comprising contact details, a portrait picture, and a business card image, and provide access to stored business attributes of the second user 14. The central server is also configured to register the outside server 32 for the first user 12.

The first mobile communications device 26 of the first user 12 triggers two functions, namely BLE CENTRAL and BLE PERIPHERAL, upon the first user pressing the RADAR MODE in the application which is installed in the first mobile communications device 26. The second mobile communications device 28 of the second user 14 triggers two functions, namely BLE CENTRAL and BLE PERIPHERAL, upon the second user pressing the RADAR MODE in the application which is installed in the second mobile communications device 28.

The BLE PERIPHERAL function triggered by the first mobile communications device 26 is configured to transmit broadcasting signals to advertise the stored AUIC and MUIC information of the first user 12. The BLE CENTRAL function triggered by the second mobile communications device 28 is configured to receive the broadcasting signal of the BLE PERIPHERAL function from the first mobile communications device 26 within a proximity location, and to only accept the broadcasting signal upon the identification and matching of the AUIC information in the broadcasting signal from the first mobile communications device 26.

The second mobile communications device 28 is configured to transmit the MUIC information of the first user 12 upon accepting the broadcasting signal from the first mobile communications device 26.

The central server 10 is configured to receive the MUIC information of the first user 12 transmitted from the second mobile communications device 28 through Internet and to subsequently transmit the stored business attributes of the second user 14 and the MUIC information of the first user 12 to the outside server 32 for the first user.

The outside server 32 for the first user 12 is configured to relay and transmit the business attributes of the second user 14 to the first mobile communications device 26 through Internet upon receiving the MUIC information of the first user 12 and the business attributes of the second user 14 from the central server 10.

The first mobile communications device 26 is configured to display the portrait picture and name of the second user 14 on the screen through the installed application upon receiving the business attributes of the second user 14 transmitted from the outside server 32 for the first user 12, and the first user 12 selects the second user 14 by pressing on the portrait picture.

The first mobile communications device 26 stores the AUIC and MUIC information assigned by the outside server 32 through the application. The second mobile communications device 28 stores the AUIC and MUIC information assigned by the central server 10 through the application. The MUIC of first mobile communication device 26 and its outside server 32 is also registered with the central server. Both the outside server and central server assigns the same AUIC to all members' mobile devices.

The first user 12 and the second user 14 are registered members of the outside server 32 and the central server 10 respectively, and both the outside server 32 and the central server 10 are operable to disclose business attributes of the first user 12 and the second user 14 respectively. The central server 10 is configured to receive the MUIC information from the second communications device 28 regarding other mobile users in proximity to the second user's location.

FIG. 5 shows in detail how mobile users of different servers may exchange business attributes in four steps. Step 1: two or more mobile users (the first user 12 and the second user 14 here) wishing to exchange business attributes press the RADAR MODE in the installed application.

Step 2: the first mobile communications device 26 and the second mobile communications device 28 are configured to trigger two functions, namely BLE CENTRAL and BLE PERIPHERAL, upon users pressing the RADAR MODE in the installed application. The BLE PERIPHERAL function triggered by the first mobile communications device 26 transmits broadcasting signals to advertise the AUIC and MUIC information of the first user 12. The BLE CENTRAL function triggered by the second mobile communications device 28 receives the broadcasting signal of the BLE PERIPHERAL function from the first mobile communications device 26 within a proximity location of 20 meters in maximum. The BLE CENTRAL function only accepts the broadcasting signal upon the identification and matching of the AUIC information in the broadcasting signal of the BLE PERIPHERAL function from the first mobile communications device 26.

Step 3: said second mobile communications device 28 is configured to transmit the MUIC information of the first user 12 upon accepting the broadcasting signal from the first mobile communications device 26. The central server 10 is configured to receive the MUIC information of the first user 12 transmitted from the second mobile communications device 28 through Internet and to subsequently transmit the stored business attributes of the second user 14 and the MUIC information of the first user 12 to the outside server 32 for the first user 12. The outside server 32 for said first user 12 is configured to relay and transmit the business attributes of said second user 14 to said first mobile communications device 26 through Internet upon receiving the MUIC information of said first user 12 and the business attributes of said second user 14 from said central server 10.

Step 4: The first mobile communications device 26 then displays the portrait picture and name of the second user 14 on the screen upon receiving the business attributes of the second user 14 transmitted from the outside server 32 for said first user 12, and the first user 12 has the option to select the second user 14 by pressing on the portrait picture and view the stored business attributes.

FIG. 6 is a flowchart depicting the process of a first user 12 with an outside server 46 initiating business attributes exchange by advertising her own AUIC and MUIC information, and receiving business attributes of a second user 14 from the outside server 46 without engaging the central server, according to an embodiment herein. A central server allows communication between a plurality of mobile users with connection through internet and facilitates business information exchange between the first user 12 and the second user 14, and the central server 10 assigns unique identification information of mobile user devices through Internet The central server 10 is in communication with the first mobile communication device 40 and the second mobile communications device 42 respectively through internet connection via an application installed on the devices, and is configured to assign an APP UNIQUE IDENTIFICATION NUMBER (AUIC) and a MEMBER UNIQUE IDENTIFICATION NUMBER (MUIC) to the first mobile communications device 40 and the second mobile communications device 42 respectively.

An outside server 46, which is registered with the central server 10, is configured to store business attributes of both the first user 12 and the second user 14 comprising contact details, a portrait picture, and a business card image respectively, and provide access to the stored business attributes of the first user 12 and the second user 14.

The first mobile communications device 40 is configured to trigger two functions, namely BLE CENTRAL and BLE PERIPHERAL, upon said first user pressing the RADAR MODE in the application, and the RADAR MODE also triggers internet connection of the first mobile communications device 40 to inform the location of the first user 12 to the outside server 46. The second mobile communications device 42 is configured to trigger two functions, namely BLE CENTRAL and BLE PERIPHERAL, upon the second user 14 pressing the RADAR MODE in the application, and the RADAR MODE also triggers internet connection of said second mobile communications device 42 to inform the location of said second user 14 to said outside server 46. The BLE PERIPHERAL function triggered by the first mobile communications device 40 is configured to transmit broadcasting signals to advertise the stored AUIC and MUIC information of the first user 12. The BLE CENTRAL function triggered by the second mobile communications device 42 is configured to receive the broadcasting signal of the BLE PERIPHERAL function from the first mobile communications device 40 within a proximity location, and to only accept the broadcasting signal upon the identification and matching of the AUIC information in the broadcasting signal from the first mobile communications device 40.

The second mobile communications device 42 is configured to transmit the MUIC information of the first user 12 upon accepting the broadcasting signal from the first mobile communications device 40, The outside server 46 is configured to receive the MUIC information of the first user 12 transmitted from the second mobile communications device 42 through Internet and to subsequently transmit the stored business attributes of the second user 14 to the first mobile communications device 40 through Internet upon receiving the MUIC information of the first user 12, The first mobile communications device 40 is configured to display the portrait picture and name of the second user on the screen through the installed application upon receiving the business attributes transmitted from the outside server 46, and the first user selects the second user by pressing on the portrait picture. The outside server 46 is configured to locate business attributes about the second user 14 from a social network storage file of the second user 14, and transmit business attributes to the first mobile communications device 40 for further information beyond first introductory attributes such as portrait picture and name.

Both the first and second users are registered members of the outside server 46, and the outside server 46 is operable to disclose business attributes of the first user 12 and second user 14 respectively.

The outside server 46 is configured to transmit to the first user 12 further business attributes of the second user 14 beyond the portrait picture and name in the search results upon receiving the MUIC information of the first user 12.

FIG. 6 shows in detail how mobile users of different servers may exchange business attributes without engaging the central server in four steps. Step 1: two or more registered mobile users (the first user 12 and the second user 14 here) wishing to exchange business attributes press the RADAR MODE in the installed application.

Step 2: the first mobile communications device 40 and the second mobile communications device 42 are configured to trigger two functions, namely BLE CENTRAL and BLE PERIPHERAL, upon users pressing the RADAR MODE in the installed application. The BLE PERIPHERAL function triggered by the first mobile communications device 40 transmits broadcasting signals to advertise the AUIC and MUIC information of the first user 12. The BLE CENTRAL function triggered by the second mobile communications device 42 receives the broadcasting signal of the BLE PERIPHERAL function from the first mobile communications device 40 within a proximity location of 20 meters in maximum. The BLE CENTRAL function only accepts the broadcasting signal upon the identification and matching of the AUIC information in the broadcasting signal of the BLE PERIPHERAL function from the first mobile communications device 40.

Step 3: the second mobile communications device 42 is configured to transmit the MUIC information of the first user 12 upon accepting the broadcasting signal from the first mobile communications device 40, and the outside server 46 is configured to receive the MUIC information of the first user 12 transmitted from the second mobile communications device 42 through Internet and to subsequently transmit stored business attributes of the second user 14 to the first mobile communications device 40 through Internet upon receiving the MUIC information of the first user 12.

Step 4: The first mobile communications device 40 then displays the portrait picture and name of the second user 14 on the screen, and the first user 12 has the option to select the second user 14 by pressing on the portrait picture and view the stored business attributes.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting.

The invention claimed is:

1. A system comprising:
   a central server configured to allow communication between a plurality of registered mobile users with connection through internet and to facilitate business information exchange between a first user and a second user, wherein said central server manages introduction and connection of a plurality of registered mobile users by positive identification of mobile users through the use of portrait picture(s) and names, and each registered mobile user discovers other registered mobile users within proximity through their mobile devices, and wherein said central server associates unique identification of mobile user devices through internet and returns identities of other mobile users in the vicinity or within proximity thereto, bringing an image of a portrait picture along with the names and business attributes to a device allocation; and said first user using a first mobile communications device and said second user using a second mobile communications device each operatively connected to any of a mobile telecommunications provider network and an internet connection to access said central server;

wherein said central server is in communication with said first and said second mobile communications devices through internet connection via an application installed on said first and said second mobile communications devices of the users, and is configured to assign both an APP UNIQUE IDENTIFICATION NUMBER (AUIC) and a MEMBER UNIQUE IDENTIFICATION NUMBER (MUIC) to said first mobile communications device and said second mobile communications device;

wherein said central server is configured to store the business attributes of said first user and said second user comprising contact details, the portrait picture, and a business card image upon registration in the installed application, hereinafter referred to as "stored business attributes", and provide access to the stored business attributes of said first user and said second user;

wherein said first mobile communications device is configured to trigger two functions, namely Bluetooth Low Energy (BLE) CENTRAL and BLE PERIPHERAL, upon said first user pressing the RADAR MODE in the application, and the RADAR MODE also triggers internet connection to inform the location of said first mobile communications device to said central server;

wherein said second mobile communications device is configured to trigger two functions, namely BLE CENTRAL and BLE PERIPHERAL, upon said second user pressing the RADAR MODE in the application, and the RADAR MODE also triggers internet connection to inform the location of said second mobile communications device to said central server;

wherein the BLE PERIPHERAL function triggered by said first mobile communications device is configured to transmit broadcasting signals to advertise the stored AUIC and MUIC information of said first user;

wherein the BLE CENTRAL function triggered by said second mobile communications device is configured to receive the broadcasting signal of the BLE PERIPHERAL function from said first mobile communications device within proximity, and to only accept the broadcasting signal upon the identification and matching of the AUIC information in the broadcasting signal from said first mobile communications device;

wherein said second mobile communications device is configured to transmit the MUIC information of said first user to the said central server upon accepting the broadcasting signal from said first mobile communications device;

wherein said central server is configured to receive the MUIC information of said first user transmitted from said second mobile communications device through internet and to subsequently transmit the stored business attributes of said second user to said first mobile communications device through internet upon receiving the MUIC information of said first user;

wherein said first mobile communications device is configured to display the portrait picture and the name of said second user on the screen of the first mobile device through the installed application upon receiving the stored business attributes of said second user transmitted from said central server, and said first user selects said second user by pressing on the portrait picture of said second user;

wherein said central server is configured to locate the business attributes about said first user from a social network storage file of said first user, and transmit the business attributes about said first user to said second mobile communications device for further information beyond the portrait picture and the name of said first user.

2. The system as set forth in claim 1 wherein said first mobile communications device stores the AUIC and MUIC information of said first user assigned by said central server through the application.

3. The system as set forth in claim 1 wherein said second mobile communications device stores the AUIC and MUIC information of said second user assigned by said central server through the application.

4. The system as set forth in claim 1 wherein said RADAR MODE is configured to trigger two functions, namely BLE CENTRAL and BLE PERIPHERAL, for a predefined period of time and broadcasting signal strength, wherein the BLE PERIPHERAL function is configured to transmit a broadcasting signal to advertise and broadcast said first user's AUIC and MUIC information to all other registered mobile users in the vicinity of 20 meters in maximum in clear space.

5. The system as set forth in claim 1 wherein the BLE CENTRAL function from said second mobile communications device is configured to receive all broadcasting signals from the BLE PERIPHERAL function within proximity, and to only accept the broadcasting signal from said first mobile communications device upon the identification and matching of the AUIC information in the broadcasting signal of the BLE PERIPHERAL function.

6. The system as set forth in claim 1 wherein said first and second users are members of registered mobile users, and wherein said central server is operable to disclose business attributes of said first user and said second user in the vicinity.

7. The system as set forth in claim 1 wherein said central server is operable to provide any user with business attributes of all members of registered mobile users in the vicinity or within proximity.

8. The system as set forth in claim 1 wherein said central server is configured to receive the MUIC information as the identifying signal from said second communications device regarding other registered mobile users within proximity to said second user's location.

9. The system as set forth in claim 1 wherein said central server is configured to transmit to said first user further business attributes of one or more of selected additional users beyond the portrait picture and the name returned in the identities.

10. A method comprising:
using a central server to allow communication between a plurality of registered mobile users with connection through internet and to facilitate business information exchange between a first user and a second user, wherein said central server manages introduction and connection of a plurality of registered mobile users by positive identification of mobile users through the use of portrait picture(s) and names, and each registered mobile user discovers other registered mobile users within proximity through their mobile devices, and wherein said central server associates unique identification of registered mobile user devices through internet and returns identities of other registered mobile users in the vicinity or within proximity thereto, bringing an image of a portrait picture along with the names and business attributes to a device allocation; and providing a first user using a first mobile communications device and a second user using a second mobile communications device each capable of connecting to internet through any of a mobile telecommunications provider network and a local area wireless network;

using said central server to be in communication with said first and said second mobile communications devices through internet connection via an application installed on said first user and said second mobile communications devices of the users, and to provide access to stored user profile information about said first and said second user, including the business attributes comprising the portrait picture(s), the names, and a location;

using said central server to store the business attributes of said first user and said second user comprising contact details, the portrait picture, and a business card image, hereinafter referred to as "stored business attributes", and provide access to the stored business attributes of said first user and said second user;

using said central server to be in communication with said first and said second mobile communications devices through internet connection via an application installed to said first and said second mobile communications devices of the users, and to assign both an APP UNIQUE IDENTIFICATION NUMBER (AUIC) and a MEMBER UNIQUE IDENTIFICATION NUMBER (MUIC) to said first mobile communications device and said second mobile communications device;

using said first mobile communications device to trigger two functions, namely Bluetooth Low Energy (BLE) CENTRAL and BLE PERIPHERAL, upon said first user pressing the RADAR MODE in the application;

using said first mobile communications device to trigger internet connection to inform the location of said first mobile communications device to said central server upon said first user pressing the RADAR MODE in the application;

using said second mobile communications device to trigger two functions, namely BLE CENTRAL and BLE PERIPHERAL, upon said second user pressing the RADAR MODE in the application;

using said second mobile communications device to trigger internet connection to inform the location of said second mobile communications device to said central server upon said second user pressing the RADAR MODE in the application;

using the BLE PERIPHERAL function triggered by said first mobile communications device to transmit broadcasting signals to advertise the stored AUIC and MUIC information of said first user;

using the BLE CENTRAL function triggered by said second mobile communications device to receive the broadcasting signal of the BLE PERIPHERAL function from said first mobile communications device within proximity, and to only accept the broadcasting signal upon the identification and matching of the AUIC information in the broadcasting signal from said first mobile communications device;

using said central server to receive the MUIC information of said first user from said second mobile communications device through internet and transmitting the contact details, the portrait picture and the business card image of said second user to said first mobile communications device through internet upon receiving the MUIC information of said first user;

using said first mobile communications device to display the portrait picture and the name of said second user on the screen through the installed application upon receiving the stored business attributes of said second user transmitted from said central server, and allowing said first user to select said second user by pressing on the portrait picture of said second user;

using said central server to locate the business attributes about said first user from a social network storage file of said first user, and to transmit the business attributes about said first user to said second mobile communications device for further information beyond the portrait picture and the name of said first user.

11. The method as set forth in claim 10, further comprising using said first mobile communications device to store the AUIC and MUIC information of said first user assigned by said central server through the installed application.

12. The method as set forth in claim 10, further comprising using said second mobile communications device to store the AUIC and MUIC information of said second user assigned by said central server through the installed application.

13. The method as set forth in claim 10, further comprising using said RADAR MODE to trigger two signals, namely BLE CENTRAL and BLE PERIPHERAL, for a predefined period of time and broadcasting signal strength, wherein the BLE PERIPHERAL signal is configured to advertise and broadcast said first user's AUIC and MUIC to all other registered mobile users in the vicinity of 20 meters in maximum in clear space.

14. The method as set forth in claim 10, further comprising using the BLE CENTRAL signal from said second mobile communications device to receive all broadcasting signals from the BLE PERIPHERAL function within proximity, and only accepting the broadcasting signal from said first mobile communications device upon the identification and matching of the AUIC information in the broadcasting signal of the BLE PERIPHERAL function.

15. The method as set forth in claim 10, further comprising using said central server to disclose business attributes of said first user and said second user in the vicinity.

16. The method as set forth in claim 10, further comprising using said central server to provide any user with business attributes of all members of registered mobile users in the vicinity or within proximity location upon receiving the MUIC of nearby users.

17. The method as set forth in claim 10, further comprising using said central server to receive the MUIC information as the identifying signal from said second communications device regarding other registered mobile users within proximity to said second user's location.

18. The method as set forth in claim 10, further comprising using said central server to transmit to said first user further business attributes of one or more of selected additional users beyond the portrait picture and the name returned in the identities.

19. A system comprising:
a central server configured to allow communication between a plurality of mobile users with connection through internet and to facilitate business information exchange between a first user and a second user;
wherein said central server manages introduction and connection of a plurality of mobile users by positive identification of mobile users through the use of portrait picture(s) and names, and said central server associates unique identification of mobile user devices through internet and via a search process returns search results of other mobile users in the vicinity or within proximity thereto, bringing an image of a portrait picture along with the names and business attributes to a device allocation in the search process; and said first user using a first mobile communications device and said second user using a second mobile communications device each operatively connected to any of a mobile telecommunications provider network and an internet connection to access said central server;

wherein said central server is in communication with said first and said second mobile communications devices through internet connection via an application installed on said first and said second mobile communications devices of the users, and is configured to assign both an APP UNIQUE IDENTIFICATION NUMBER (AUIC) and a MEMBER UNIQUE IDENTIFICATION NUMBER (MUIC) to said first mobile communications device and said second mobile communications device;

wherein an outside server for said first user is configured to store the MUIC and the business attributes of said first user comprising contact details, the portrait picture, and a business card image, hereinafter referred to as "stored business attributes", and provide access to the stored business attributes of said first user;

wherein said central server is configured to store the business attributes of said second user comprising contact details, the portrait picture, and a business card image, and provide access to the stored business attributes of said second user, wherein said first mobile communications device is configured to trigger two functions, namely Bluetooth Low Energy (BLE) CENTRAL and BLE PERIPHERAL, upon said first user pressing the RADAR MODE in the application, and the RADAR MODE also triggers internet connection to inform the location of said first mobile communications device to the outside server for said first user;

wherein said second mobile communications device is configured to trigger two functions, namely BLE CENTRAL and BLE PERIPHERAL, upon said second user pressing the RADAR MODE in the application, and the RADAR MODE also triggers internet connection to inform the location of said second mobile communications device to the central server for said second user;

wherein the BLE PERIPHERAL function triggered by said first mobile communications device is configured to transmit broadcasting signals to advertise the stored AUIC and MUIC information of said first user;

wherein the BLE CENTRAL function triggered by said second mobile communications device is configured to receive the broadcasting signal of the BLE PERIPHERAL function from said first mobile communications device within a proximity, and to only accept the broadcasting signal upon the identification and matching of the AUIC information in the broadcasting signal from said first mobile communications device;

wherein said second mobile communications device is configured to transmit the MUIC information of said first user upon accepting the broadcasting signal from said first mobile communications device, wherein said central server is configured to receive the MUIC information of said first user transmitted from said second mobile communications device through internet and to subsequently transmit the stored business attributes of said second user and the MUIC information of said first user to the outside server for said first user;

wherein the outside server for said first user is configured to relay and transmit the stored business attributes of said second user to said first mobile communications device through internet upon receiving the MUIC information of said first user and the stored business attributes of said second user from said central server;

wherein said first mobile communications device is configured to display the portrait picture and the name of said second user on the screen through the installed application upon receiving the stored business attributes of said second user transmitted from the outside server for said first user, and said first user selects said second user by pressing on the portrait picture of said second user.

20. The system as set forth in claim 19 wherein said first mobile communications device stores the AUIC and MUIC information assigned by said central server through the application.

21. The system as set forth in claim 19 wherein said second mobile communications device stores the AUIC and MUIC information assigned by said central server through the application.

22. The system as set forth in claim 19 wherein said RADAR MODE is configured to trigger two functions, namely BLE CENTRAL and BLE PERIPHERAL, for a predefined period of time and broadcasting signal strength, and wherein the BLE PERIPHERAL function is configured to transmit a broadcasting signal to advertise and broadcast said first user's AUIC and MUIC information to all other mobile users in the vicinity of 20 meters in maximum in clear space.

23. The system as set forth in claim 19 wherein the BLE CENTRAL function from said second mobile communications device is configured to receive all broadcasting signals from the BLE PERIPHERAL function within proximity, and to only accept the broadcasting signal from said first mobile communications device upon the identification and matching of the AUIC information in the broadcasting signal of the BLE PERIPHERAL function.

24. The system as set forth in claim 19 wherein said first user is a registered member of the outside server for said first user and said second user is a registered member of said central server and wherein both the outside server for said first user and said central server are operable to disclose business attributes of said first user and said second user.

25. A method comprising:
using a central server to communicate between a plurality of mobile users with connection through internet and to facilitate business information exchange between a first user and a second user, wherein said central server manages introduction and connection of a plurality of mobile users by positive identification of mobile users through the use of portrait picture(s) and names, and said central server associates unique identification of mobile user devices through internet and via a search process returns search results of other mobile users in the vicinity or within proximity thereto, bringing an image of a portrait picture along with the names and business attributes to a device allocation in the search process; and providing said first user using a first mobile communications device and said second user using a second mobile communications device each operatively connected to any of a mobile telecommunications provider network and an internet connection to access said central server;

using said central server to be in communication with said first and said second mobile communications devices through internet connection via an application installed on said first and said second mobile communications devices of the users, and to assign both an APP UNIQUE IDENTIFICATION NUMBER (AUIC) and a MEMBER UNIQUE IDENTIFICATION NUMBER (MUIC) to said first mobile communications device and said second mobile communications device;

using an outside server for said first user to store the MUIC and the business attributes of said first user comprising contact details, the portrait picture, and a business card image, hereinafter referred to as "stored business attributes", and provide access to the stored business attributes of said first user;

using said central server to store the business attributes of said second user comprising contact details, the portrait picture, and a business card image, and provide access to the stored business attributes of said second user;

using said first mobile communications device to trigger two functions, namely Bluetooth Low Energy (BLE) CENTRAL and BLE PERIPHERAL, upon said first user pressing the RADAR MODE in the application;

using said first mobile communications device to trigger internet connection to inform the location of said first mobile communications device to the outside server for said first user;

using said second mobile communications device to trigger two functions, namely BLE CENTRAL and BLE PERIPHERAL, upon said second user pressing the RADAR MODE in the application;

using said second mobile communications device to trigger internet connection to inform the location of said second mobile communications device to said central server;

using the BLE CENTRAL function triggered by said second mobile communications device to receive the broadcasting signal of the BLE PERIPHERAL function from said first mobile communications device within proximity, and only accepting the broadcasting signal upon the identification and matching of the AUIC information in the broadcasting signal from said first mobile communications device;

using said second mobile communications device to transmit the MUIC information of said first user upon accepting the broadcasting signal from said first mobile communications device;

using said central server to receive the MUIC information of said first user transmitted from said second mobile communications device through internet and to subsequently transmit the stored business attributes of said second user and the MUIC information of said first user to the outside server for said first user;

using the outside server for said first user to relay and transmit the stored business attributes of said second user to said first mobile communications device through internet upon receiving the MUIC information of said first user and the stored business attributes of said second user from said central server;

using said first mobile communications device to display the portrait picture and the name of said second user on the screen through the installed application upon receiving the stored business attributes of said second user transmitted from the outside server for said first user, and allowing said first user to select said second user by pressing on the portrait picture of said second user.

26. The method as set forth in claim 25, further comprising using said first mobile communications device to store the AUIC and MUIC information assigned by said central server through the application.

27. The method as set forth in claim 25, further comprising using said second mobile communications device to store the AUIC and MUIC information assigned by said central server through the application.

28. The method as set forth in claim 25, further comprising using said RADAR MODE to trigger two functions, namely BLE CENTRAL and BLE PERIPHERAL, for a predefined period of time and broadcasting signal strength, and wherein the BLE PERIPHERAL function is configured to transmit a broadcasting signal to advertise and broadcast said first user's AUIC and MUIC information to all other mobile users in the vicinity of 20 meters in maximum in clear space.

29. The method as set forth in claim 25, further comprising using the BLE CENTRAL function from said second mobile communications device to receive all broadcasting signals from the BLE PERIPHERAL function within proximity, and only accepting the broadcasting signal from said first mobile communications device upon the identification and matching of the AUIC information in the broadcasting signal of the BLE PERIPHERAL function.

30. The method as set forth in claim 25, further comprising using the outside server for said first user to store business attributes of said first user upon registration and using said central server to store business attributes of both said first and second users upon registration, and wherein both the outside server for said first user and said central server are operable to disclose business attributes of said first user and said second user.

31. A system comprising:
a central server configured to allow communication between a plurality of mobile users with connection through internet and to facilitate business information exchange between a first user and a second user, and said central server assigns unique identification information of mobile user devices through internet; and
said first user using a first mobile communications device and said second user using a second mobile communications device each operatively connected to any of a mobile telecommunications provider network and an internet connection to access said central server;
wherein said central server is in communication with said first and said second mobile communications devices through internet connection via an application installed on said first and said second mobile communications devices of the users, and is configured to assign both an APP UNIQUE IDENTIFICATION NUMBER (AUIC) and a MEMBER UNIQUE IDENTIFICATION NUMBER (MUIC) to said first mobile communications device and said second mobile communications device;
wherein an outside server is configured to store the MUIC and business attributes of both said first user and said second user comprising contact details, a portrait picture, and a business card image, hereinafter referred to as "stored business attributes", and provide access to the stored business attributes of said first user and said second user;
wherein said first mobile communications device is configured to trigger two functions, namely Bluetooth Low Energy (BLE) CENTRAL and BLE PERIPHERAL, upon said first user pressing the RADAR MODE in the application, and the RADAR MODE also triggers internet connection of said first mobile communications device to inform the location of said first user to said outside server;
wherein said second mobile communications device is configured to trigger two functions, namely BLE CENTRAL and BLE PERIPHERAL, upon said second user pressing the RADAR MODE in the application, and the RADAR MODE also triggers internet connection of said second mobile communications device to inform the location of said second user to said outside server;
wherein the BLE PERIPHERAL function triggered by said first mobile communications device is configured to transmit broadcasting signals to advertise the stored AUIC and MUIC information of said first user;
wherein the BLE CENTRAL function triggered by said second mobile communications device is configured to receive the broadcasting signal of the BLE PERIPHERAL function from said first mobile communications device within proximity, and to only accept the broadcasting signal upon the identification and matching of the AUIC information in the broadcasting signal from said first mobile communications device;
wherein said second mobile communications device is configured to transmit the MUIC information of said first user upon accepting the broadcasting signal from said first mobile communications device;
wherein said outside server is configured to receive the MUIC information of said first user transmitted from said second mobile communications device through internet and to subsequently transmit the stored business attributes of said second user to said first mobile communications device through internet upon receiving the MUIC information of said first user;
wherein said first mobile communications device is configured to display the portrait picture and the name of said second user on the screen through the installed application upon receiving the stored business attributes transmitted from said outside server, and said first user selects said second user by pressing on the portrait picture of said second user;
wherein said outside server is configured to locate the business attributes about said second user from a social network storage file of said second user, and transmit the business attributes about said second user to said first mobile communications device for further information beyond the portrait picture and the name of said second user.

32. The system as set forth in claim 31 wherein said first mobile communications device stores the AUIC and MUIC information assigned by said central server through the application.

33. The system as set forth in claim 31 wherein said second mobile communications device stores the AUIC and MUIC information assigned by said central server through the application.

34. The system as set forth in claim 31 wherein said RADAR MODE is configured to trigger two functions, namely BLE CENTRAL and BLE PERIPHERAL, for a predefined period of time and broadcasting signal strength, and wherein the BLE PERIPHERAL function is configured to transmit a broadcasting signal to advertise and broadcast said first user's AUIC and MUIC information to all other mobile users in the vicinity of 20 meters in maximum in clear space.

35. The system as set forth in claim 31 wherein the BLE CENTRAL function from said second mobile communications device is configured to receive all broadcasting signals from the BLE PERIPHERAL function within proximity, and to only accept the broadcasting signal from said first mobile communications device upon the identification and matching of the AUIC information in the broadcasting signal of the BLE PERIPHERAL function.

36. The system as set forth in claim 31 wherein both said first and second users are registered members of said outside server, and wherein said outside server is operable to disclose business attributes of said first user and said second user.

37. The system as set forth in claim 31 wherein said outside server is configured to transmit to said first user further business attributes of said second user beyond the portrait picture and name in the search results upon receiving the MUIC information of said first user.

38. A method comprising:
using a central server to communicate between a plurality of mobile users with connection through internet and to facilitate business information exchange between a first user and a second user, and to assign unique identification information of mobile user devices through internet;
providing said first user using a first mobile communications device and said second user using a second mobile communications device each operatively connected to any of a mobile telecommunications provider network and an internet connection to access said central server;
using said central server to be in communication with said first and said second mobile communications devices through internet connection via an application installed on said first and said second mobile communications devices of the users, and to assign both an APP UNIQUE IDENTIFICATION NUMBER (AUIC) and a MEMBER UNIQUE IDENTIFICATION NUMBER (MUIC) to said first mobile communications device and said second mobile communications device;
using an outside server to store business attributes of both said first user and said second user comprising contact details, a portrait picture, and a business card image, hereinafter referred to as "stored business attributes", and providing access to the stored business attributes of said first user and said second user;
using said first mobile communications device to trigger two functions, namely Bluetooth Low Energy (BLE) CENTRAL and BLE PERIPHERAL, upon said first user pressing the RADAR MODE in the application, and using RADAR MODE to trigger internet connection of said first communications device to inform the location of said first user to said outside server;
using said second mobile communications device to trigger two functions, namely BLE CENTRAL and BLE PERIPHERAL, upon said second user pressing the RADAR MODE in the application, and using RADAR MODE to trigger internet connection of said second communications device to inform the location of said second user to said outside server, using the BLE PERIPHERAL function triggered by said first mobile communications device to transmit broadcasting signals to advertise the stored AUIC and MUIC information of said first user;
using the BLE CENTRAL function triggered by said second mobile communications device to receive the broadcasting signal of the BLE PERIPHERAL function from said first mobile communications device within proximity, and to only accept the broadcasting signal upon the identification and matching of the AUIC information in the broadcasting signal from said first mobile communications device;
using said second mobile communications device to transmit the MUIC information of said first user upon accepting the broadcasting signal from said first mobile communications device;
using said outside server to receive the MUIC information of said first user transmitted from said second mobile communications device through internet and to subsequently transmit the stored business attributes of said second user to said first mobile communications device through internet upon receiving the MUIC information of said first user;
using said first mobile communications device to display the portrait picture and the name of said second user on the screen through the installed application upon receiving the stored business attributes transmitted from said outside server, and allowing said first user to select said second user by pressing on the portrait picture of the second user;
using said outside server to locate the business attributes about said second user from a social network storage file of said second user, and to transmit the business attributes about said second user to said first mobile communications device for further information beyond the portrait picture and the name of said second user.

39. The method as set forth in claim 38, further comprising using said first mobile communications device to store the AUIC and MUIC information assigned by said central server through the application.

40. The method as set forth in claim 38, further comprising using said second mobile communications device to store the AUIC and MUIC information assigned by said central server through the application.

41. The method as set forth in claim 38, further comprising using said RADAR MODE to trigger two functions, namely BLE CENTRAL and BLE PERIPHERAL, for a predefined period of time and broadcasting signal strength, and wherein the BLE PERIPHERAL function is configured to transmit a broadcasting signal to advertise and broadcast said first user's AUIC and MUIC information to all other mobile users in the vicinity of 20 meters in maximum in clear space.

42. The method as set forth in claim 38, further comprising using the BLE CENTRAL function from said second mobile communications device to receive all broadcasting signals from the BLE PERIPHERAL function within proximity, and to only accept the broadcasting signal from said first mobile communications device upon the identification and matching of the AUIC information in the broadcasting signal of the BLE PERIPHERAL function.

43. The method as set forth in claim 38, further comprising using said outside server to store business attributes of both said first user and said second user upon registration, and wherein said outside server is operable to disclose business attributes of said first user and said second user.

44. The method as set forth in claim 38, further comprising using said outside server to transmit to said first user further business attributes of said second user beyond the portrait picture and name in the search results upon receiving the MUIC information of said first user.

* * * * *